US008215111B1

(12) United States Patent
Richey

(10) Patent No.: US 8,215,111 B1
(45) Date of Patent: Jul. 10, 2012

(54) ELECTRICAL GENERATION FROM EXPLOSIVES

(76) Inventor: Robert J. Richey, Campbell, CA (US)

( * ) Notice: Subject to any disclaimer, the term of this patent is extended or adjusted under 35 U.S.C. 154(b) by 502 days.

(21) Appl. No.: 12/386,822

(22) Filed: Apr. 23, 2009

Related U.S. Application Data

(60) Provisional application No. 61/100,915, filed on Sep. 29, 2008.

(51) Int. Cl.
*F01B 29/00* (2006.01)
*F16D 31/00* (2006.01)
*F16D 39/00* (2006.01)

(52) U.S. Cl. ................................ 60/512; 60/325; 60/415

(58) Field of Classification Search .................... 60/369, 60/484, 516, 632, 634, 675, 914
See application file for complete search history.

(56) References Cited

U.S. PATENT DOCUMENTS 178,925 A * 6/1876 Hardy .............................. 60/634
3,611,723 A * 10/1971 Theis .............................. 60/327
3,648,458 A * 3/1972 McAlister ....................... 60/415
3,650,572 A 3/1972 McClure
4,301,774 A 11/1981 Williams
5,551,237 A * 9/1996 Johnson ....................... 60/641.8
5,647,734 A * 7/1997 Milleron ....................... 417/380
5,713,202 A * 2/1998 Johnson ........................... 60/325
5,865,086 A * 2/1999 Petichakis P. .................... 91/4 R
6,182,615 B1 * 2/2001 Kershaw .......................... 123/19
6,739,131 B1 * 5/2004 Kershaw .......................... 60/512
7,531,908 B2 * 5/2009 Fries et al. .................... 290/1 R

FOREIGN PATENT DOCUMENTS

WO WO 01/31197 A1 3/2001

* cited by examiner

*Primary Examiner* — Thomas Denion
*Assistant Examiner* — Christopher Jetton

(57) ABSTRACT

An electrical generator converts the high blast pressures of explosives into useful electricity by capturing the explosive gases and using the high gas pressures to alternately push water hydraulically between two tanks and through water turbines connected to DC electric generators. Water expelled through a water turbine from one tank is used to fill the other tank. Batteries can be used to store the electrical energy generated, and inverters followed by transformers convert the DC electric from the turbine-generators to 110-VAC, 220-VAC, and 440-VAC. A microcomputer controller connected to various sensors and solenoid valves coordinates the timing and routing of the detonation of explosives, tank pressures, venting, valving, and load control.

9 Claims, 4 Drawing Sheets

ELECTRICAL GENERATION FROM EXPLOSIVES

RELATED APPLICATIONS

This Application claims benefit of U.S. Provisional Patent Application, A UNIQUE METHOD OF GENERATING ELECTRICITY USING EXPLOSIVE SUBSTANCES AS A POWER SOURCE, Ser. No. 61/100,915, filed Sep. 29, 2008.

BACKGROUND OF THE INVENTION

1. Field of the Invention

The present invention relates to electrical power generation, and in particular to devices and methods for converting the gas pressure generated by explosives into electricity.

2. Description of the Prior Art

Useful electrical energy does not exist in nature and it must be converted from other available energy forms such as gasoline, diesel, coal, natural gas, geothermal, steam, hydro, solar, etc. Some of these energy sources are expensive, some are highly pollutant, some are difficult to convert efficiently, and some are not very portable as is needed in vehicles.

Explosives like gunpowder; Cordite, Ballistite, and Poudre-B smokeless powders; trinitrotoluene (TNT), Dynamite; nitroglycerin; Tovex and other water gel explosives; etc., release a lot of energy in a very rapid pulse. Explosives usually have less potential energy than petroleum fuels, but their high rate of energy release produces large blast pressures. TNT has a detonation velocity of 6,940 m/s compared to 1,680 m/s for the detonation of a pentane-air mixture, and the 0.34-m/s stoichiometric flame speed of gasoline combustion in air. Explosives are classified as "low" or "high" explosives according to their rates of decomposition. Gunpowder is a low explosive, while TNT is a high explosive. Low explosives burn rapidly or deflagrate, while high explosives detonate.

The energy released includes high levels of heat, light, and gas pressure. These are all quickly dissipated if not captured or otherwise contained. For example, at 15° C. the volume of gas produced by the explosive decomposition of one mole of nitroglycerin, becomes, V=(23.64 liter/mol)(7.25 mol)=171.4 liters. The molar volume of an ideal gas at 15° C. is about 23.64 liters. The potential of an explosive is the total work that can be performed by the gas generated by the explosion. If uncontained, it expands adiabatically from its original volume until its pressure is reduced to atmospheric pressure and its temperature to ambient.

In the nitroglycerin reaction, $C_3H_5(NO_3)3 \rightarrow 3CO_2 + 2.5H_2O + 1.5N_2 + 0.25O_2$, the products are carbon dioxide, water, nitrogen, oxygen, and heat. Therefore, a relatively small solid or liquid volume is converted into a very large volume of relatively benign gases. Nitroglycerin explosions are relatively clean, compared to TNT which is poisonous and produces a lot of carbon soot in its reaction.

Firearms and artillery use the gas pressure generated by the detonation of smokeless powder to accelerate bullets and projectiles to very high muzzle velocities on the order of 2,000+ feet per second. Sticks of explosives are detonated in holes drilled into geologic deposits to fracture the ores and make removing the material as easy as scooping up the pieces.

What is needed is a device and method to convert explosive energy into a more useful form of electrical energy as used in homes and industry.

SUMMARY OF THE INVENTION

Briefly, an electrical generator embodiment of the present invention converts the high blast pressures of explosives into useful electricity by capturing the explosive gases and using the high gas pressures to alternately push water hydraulically between two tanks and through water turbines connected to DC electric generators. Water expelled through a water turbine from one tank is used to fill the other tank. Batteries can be used to store the electrical energy generated, and inverters followed by transformers convert the DC electric from the turbine-generators to 110-VAC, 220-VAC, and 440-VAC. A microcomputer controller connected to various sensors and solenoid valves coordinates the detonation of the explosives, tank pressures, venting, valving, and load control.

These and other objects and advantages of the present invention will no doubt become obvious to those of ordinary skill in the art after having read the following detailed description of the preferred embodiments which are illustrated in the various drawing figures.

IN THE DRAWINGS

Figure 1:
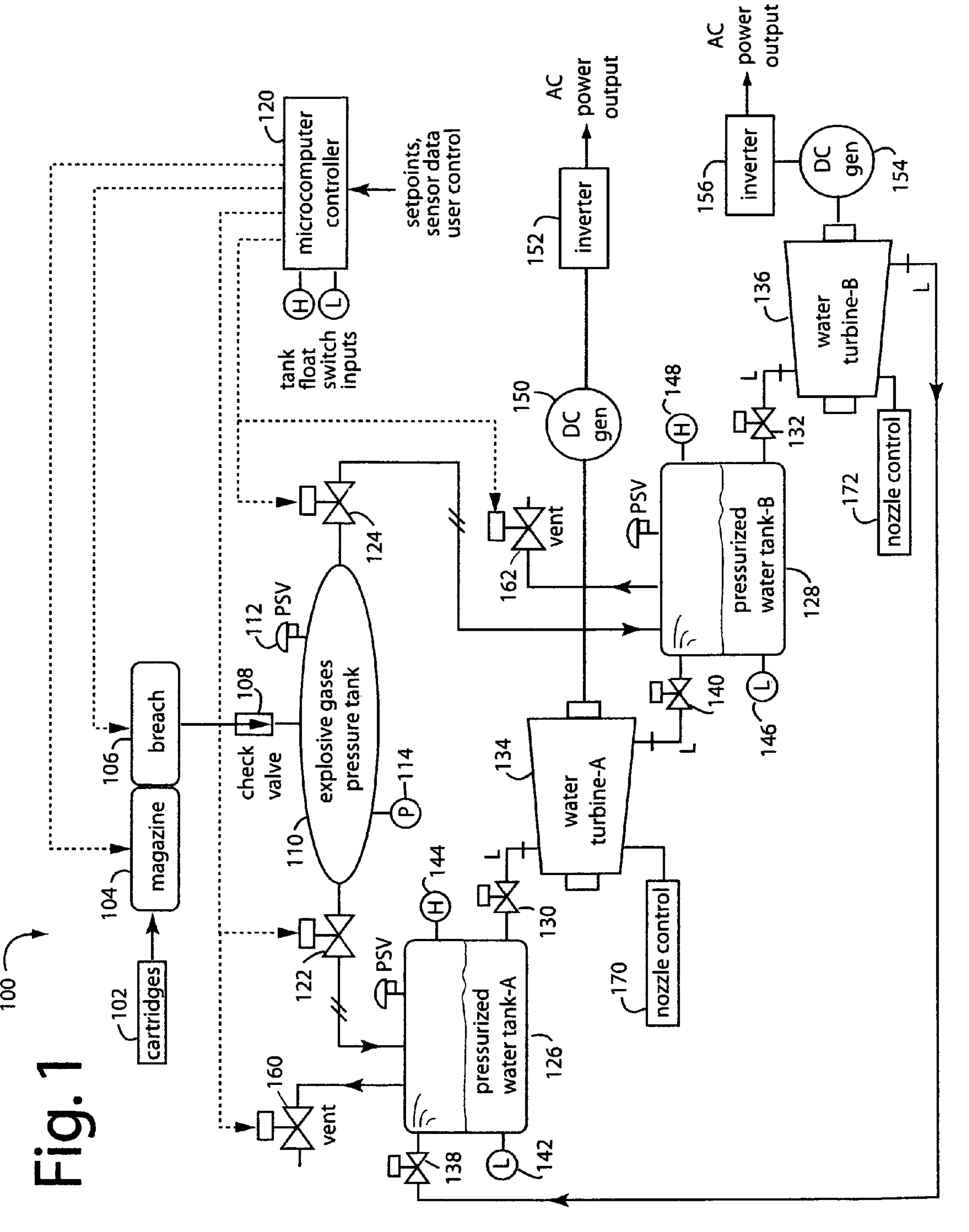
FIG. 1 is a simplified functional block diagram of a single-stage electrical generator embodiment of the present invention that cycles pressurized water between two tanks and through two sets of water turbines.
Figure 3:
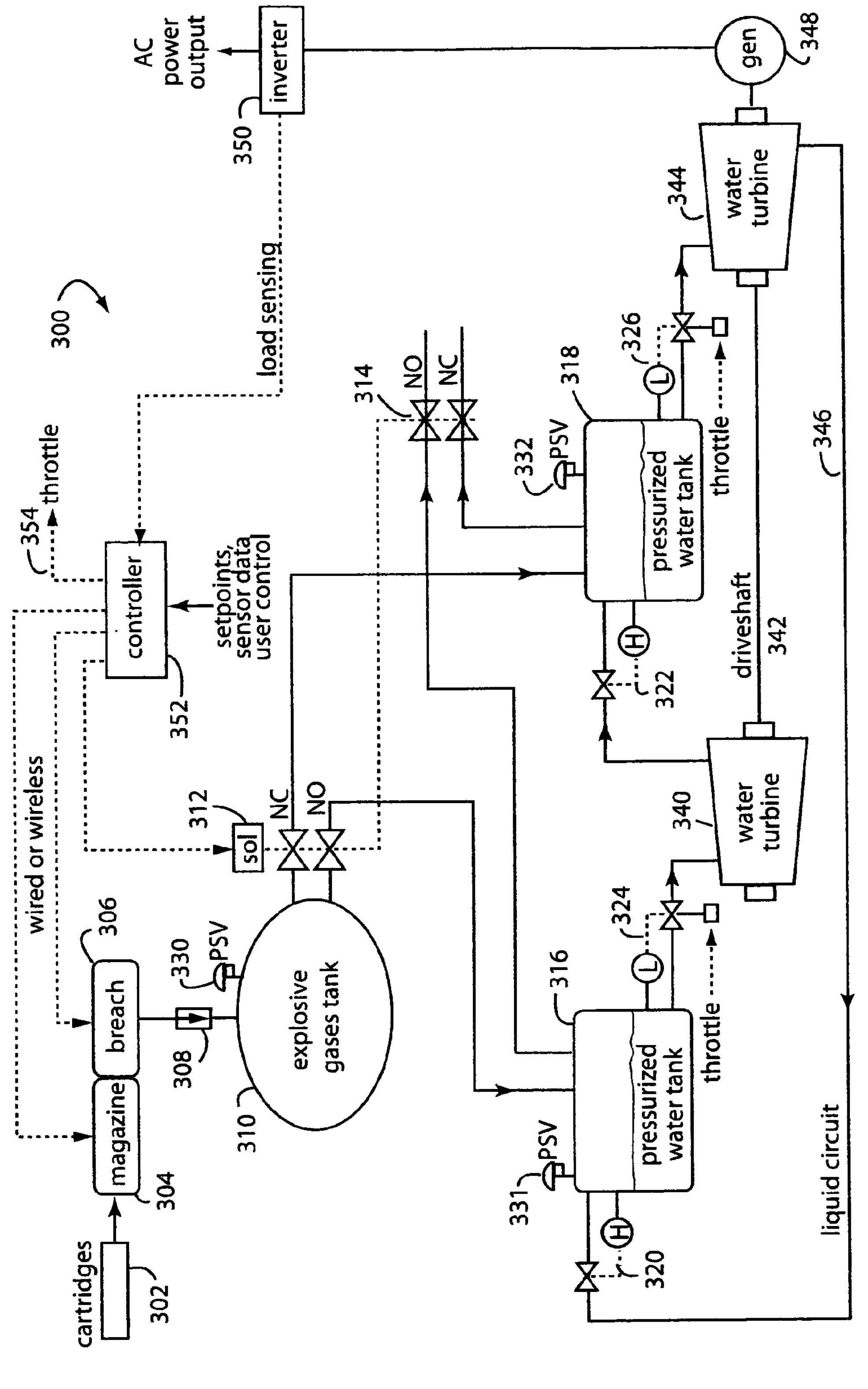
Figure 4:
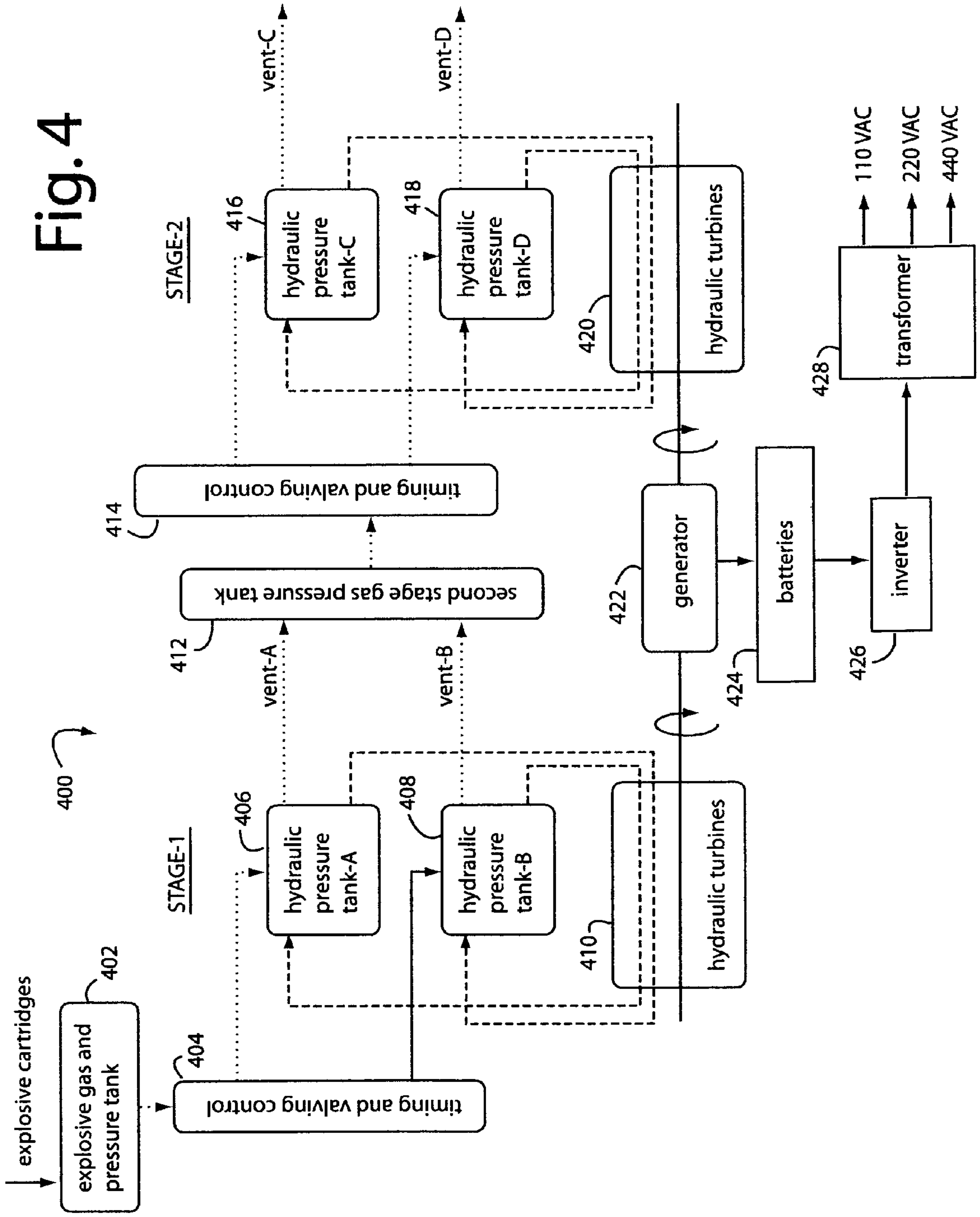

FIG. 3 is a functional block diagram of a single-stage electrical generator embodiment of the present invention that cycles pressurized water between two tanks and through two water turbines like that of FIG. 1, but that reduces duplication of the DC generators and inverters, and some of the valving; and FIG. 4 is a simplified functional block diagram of a two-stage electrical generator embodiment of the present invention that uses explosive gases to pressurize water, and then uses pressurized hydraulics to spin electrical generators with hydraulic motors and turbines.

DETAILED DESCRIPTION OF THE PREFERRED EMBODIMENT

In FIGS. 1-4 and the following text, some of the more conventional and routine elements commonly used with gas and hydraulic valves, pressure tanks, plumbing, and process control systems are not shown or described. For example, inspection ports and drains for water tanks, safety relief valves, check valves, nozzles for turbines, gearboxes and pulleys, wireless interfaces, wiring, etc. The components like these that should be used are engineering choices and are routinely stocked and installed by technicians. The critical and unusual combinations and their interrelationships are described here in detail.

FIG. 1 represents a single-stage electrical generator system embodiment of the present invention, and is referred to herein by the general reference numeral 100. Generator system 100 produces electrical power suitable for homes, businesses, industry, and the utility grid from the explosive energy captured from cartridges 102 loaded in a magazine 104 and fired in a breach 106. Cartridges 102 should include low explosives that burn clean and soot-free, and the chemical reactions should not produce any dangerous gases or byproducts. For example, nitroglycerin reactions only produce carbon dioxide, water, nitrogen, oxygen, and heat. The heat actually helps increase the gas pressures up to operating levels and should not be wasted or exhausted until the maximum in work has been extracted.

The heated gaseous explosive products are passed through a check valve 108 to a pressurized-gas tank 110. A pressure safety valve (PSV) 112 provides relief if the internal pressures exceed a safe maximum. A pressure sensor (P) 114 measures the tank pressures for a microcomputer controller 120. In some installations the pressure readings will be reported wirelessly, in others a simple 4-20 milliamp process control loop can be used.

Microcomputer controller 120 coordinates all the timing and valve control needed to operate generator system 100 and keep it safe. It uses readings from pressure sensor (P) 114 to determine when more cartridges 102 need to be loaded in magazine 104 and fired in breach 106, and it controls the actual firing. Microcomputer controller 120 also decides when and which gas pressure inlet valve 122 and 124 should be opened and closed for pressurized water tank-A 126 and pressurized water tank-B 128.

Pressurized water tank-A 126 and pressurized water tank-B 128 are not simultaneously pressurized, the pressure applied to them is alternated by gas pressure inlet valves 122 and 124 under control of microcomputer controller 120. What's important to the timing is the water levels inside the tanks, there are minimum and maximum operating levels that must be respected. Water inside one tank needs to flow out into the other tank through a water turbine, and the water cannot flow if the receiving water tank is pressurized at the same time.

In FIG. 1, an outlet valve-A 130 is opened to pass pressured liquid water (L) to a water turbine-A 134. Similarly, an outlet valve-B 132 is opened to pass pressured liquid water (L) to a water turbine-B 136. The liquid water returns from water turbine-B 136 through an inlet valve-A 138 back to water tank-A 126. Liquid water from water turbine-A 134 passes on through to inlet valve-B 140 to water tank-B 128.

The minimum and maximum operating levels of water that circulate between water tank-A 126 and water tank-B 128 are set by float switches (L, H) 142 and 144 for water tank-A 126, and by float switches (L, H) 146 and 148 for water tank-B 128. These float switches are connected to microcomputer controller 120, and the readings are used to determine when to open and close outlet valve-A 130, outlet valve-B 132, inlet valve-A 138, and inlet valve-B 140. The float switch connection could be done wirelessly, and a local loop could be included to automatically close, for example, water outlet valve-A 130 when minimum level float switch 142 senses low water.

Each water tank-A 126 and water tank-B 128 should be equipped with a water to add make up water, and to drain water completely, e.g., during maintenance.

In FIG. 1, water turbine-A 134 is mechanically connected by a rotating shaft to drive a DC electrical generator 150. The DC electrical power produced could be stored in batteries, and it is converted to AC electrical power by an inverter 152. Similarly, water turbine-B 136 is mechanically connected by a rotating shaft to drive another DC electrical generator 154. The DC electrical power produced could be stored in the same batteries, and it can also be independently converted to AC electrical power by an inverter 156. The voltage outputs of inverters 152 and 156 can be stepped-up or stepped-down by conventional transformers as needed, e.g., to 110-VAC, 220-VAC, and 440-VAC.

Microcomputer controller 120 is connected to sense the electrical loads placed on inverters 152 and 156, and uses the information to control how much pressurized water is needed to be passed through water turbine-A 134 and water turbine-B 136 to keep the overall operation in balance.

Once the pressurized gas inside the water tanks has done its job pushing out the water down to its minimum operating level, the residual pressurized gas can be vented out. For water tank-A 126, a vent valve-A 160 is used, and for water tank-B 128, a vent valve-A 162 is used. The residual gas pressures can be high enough to do useful work in a second stage generator. But any back pressure caused by the use of later stages can reduce the efficiency of the earlier stages by reducing the differential pressures between the pressurized tank and the vented one.

In operation, falling water levels inside the water tanks can be used by the minimum-level float switches 142 and 146 to trigger closed the associated water outlet valves 130 and 132. This, in turn can be used to trigger closed the gas pressure inlet valves 122 and 124, and to trigger open the gas pressure vent valves 160 and 162. Similarly, the maximum-level float switches 144 and 148 can be used to trigger closed the water inlet valves 138 and 140.

Pressurized water tank-A 126 and pressurized water tank-B 128 would normally be equipped with various conventional items not shown in FIG. 1. For example, inspection ports, drain valves, pressure gauges, pressure safety valves to release excess pressure, and a water make-up input to replace lost water.

Microcomputer controller 120 can increase and decrease the torque outputs of water turbine-A 134 and water turbine-B 136 by sending modulation controls to nozzle controls 170 and 172. Alternatively, water outlet valve-A 130 and water outlet valve-B 132 could be continuously adjustable, instead of simple fully open, fully closed solenoid types. Such torque modulation would be necessary in some applications to balance the power being generated with the loads applied. In such case, inverters 152 and 156 would also be required to provide load measurements to microcomputer controller 120.

Figure 2:
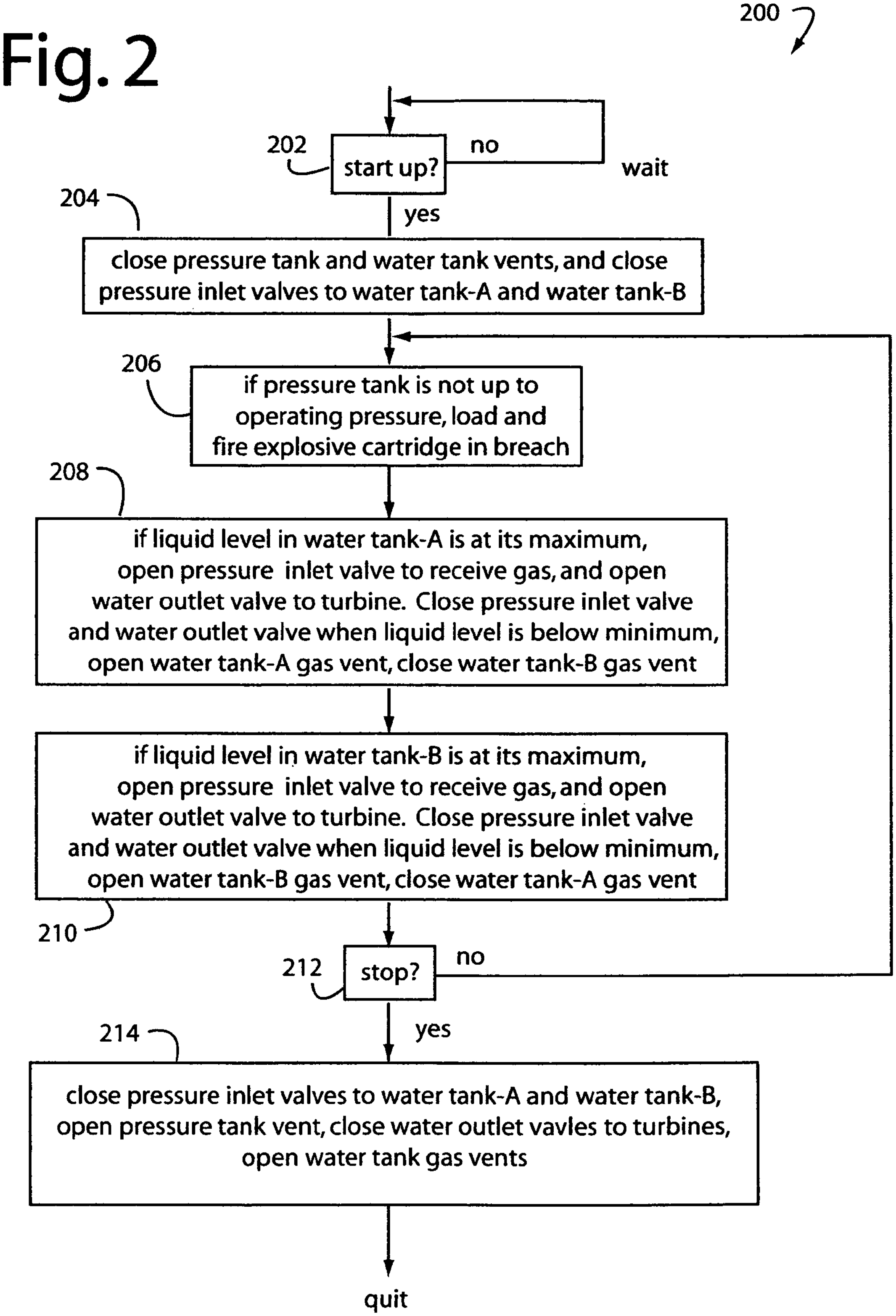
FIG. 2 is a flowchart diagram of an electrical generator method embodiment of the present invention to cycle pressurized water between two tanks and two water turbines, as in FIG. 1.

FIG. 2 represents an electrical generator method embodiment of the present invention to cycle pressurized water between two tanks and two water turbines, as in FIG. 1. Such method is referred to herein by the general reference numeral 200. Method 200 is implemented as a computer program in software or firmware executed by a conventional microcomputer, e.g., microcomputer controller 120 (FIG. 1). Data inputs from sensors and switches are digitized for processing, user inputs are used to make process control decisions, and outputs to electro-mechanical solenoids are used to operate gas and hydraulic valves.

Method 200 includes three phases of operation: (1) startup, (2) power generation, and (3) shutdown. During startup, the operational pressures and valve settings must be initialized. During power generation, the gas pressure generated by the explosive cartridges must be switched between the two water tanks according to the respective water levels inside each. The amount of water forced between the water tanks and through the water turbines must be balanced with the electrical loads being placed on the system. During shutdown, the cycling must be stopped and the pressures relieved by opening the various vents.

Specifically, method 200 includes a step 202 for checking to see if the user wants to begin operation. If so, a step 204 closes the pressure tank and water tanks vents, and closes the inlet valves to the water tanks. A step 206 gets the gas pressure in the pressure tank up to operating levels by firing explosive cartridges as needed. A step 208 checks the water level inside water tank-A and if it's at its maximum operating level, a hydraulic cycle can begin. The gas inlet valve-A is opened, the gas vent valve-A is closed, and the water outlet valve-A to the associated turbine-A is opened. The gas pressure let in will push the water out through the outlet valve-A. When the water level reaches minimum, the outlet valve-A is closed. The gas inlet valve-A is closed, and the gas vent valve-A is opened. The water inlet valve-A is opened to receive water from water tank-B.

A step 210 checks the water level inside water tank-B and if it's at its maximum operating level, a hydraulic cycle can begin. The gas inlet valve-B is opened, the gas vent valve-B is closed, and the water outlet valve-B to the associated turbine-B is opened. The gas pressure let in will push the water out through the outlet valve-B. When the water level in water tank-B reaches minimum, the outlet valve-B is closed. The gas inlet valve-B is closed, and the gas vent valve-B is opened. The water inlet valve-B is opened to receive water from water tank-A.

If the user is requesting a stop of operations, a step 212 passes control to a step 214. Otherwise, the process repeats in a loop back to step 206. Step 214 closes the gas inlet pressure valves to water tank-A and tank-B, opens the vents, and closes the water outlet valves to the turbines. Residual gas pressures inside the pressurized tank may be let down if another use cycle is not expected immediately.

FIG. 3 illustrates a single-stage system 300 that eliminates some of the duplication of the major components appearing in FIG. 1. System 300 assumes that when the water level in a water tank is below minimum, e.g., as detected by a low-water float switch, the water outlet valve should be closed. Similarly, when the water level in a water tank is above maximum, e.g., as detected by a high-water float switch, the water inlet valve should be closed. The gas inlet valve to a water tank can only be open if the gas vent is closed. The gas inlet valve to the water tank must be closed if the gas vent is open. The mechanisms implemented to enforce such logic can be built with relay logic, software, IC logic gates, and mechanical interlocks.

System 300 is powered by explosive cartridges 302 that are loaded in a magazine 304 and automatically fired under computer control in a breach 306. Explosive gases are routed through a check valve 308 to a pressurized-gas tank 310. A single 4-gang solenoid valve 312 and 314 steers high pressure gas to and vents gases from pressurized water tanks 316 and 318. When one tank is being pressured, the other is being vented. A high-water float control inlet valve 320 automatically admits water to pressurized water tank 316 when the liquid level is below the operating range maximum and the other tank 318 is receiving gas pressure from explosive-gas tank 310 through 4-gang solenoid valve 312. Another high-water float control inlet valve 322 admits water to pressurized water tank 318 when its liquid level is below its operating range maximum and its gases are vented. Similarly, a low-water float control inlet valve 324 shuts off water from pressurized water tank 316 when the liquid level falls below the operating range minimum. Another low-water float control outlet valve 326 shuts off water from pressurized water tank 318 when its liquid level is below its operating range minimum. Pressure safety valves (PSV) 330, 331, and 332 release overpressures to protect the respective tanks from rupturing.

A water turbine 340 converts the hydraulic flow through it to a mechanical torque applied to a rotating driveshaft 342. A second water turbine 344 converts its hydraulic flow to additional mechanical torque that is also applied to rotating driveshaft 342. A liquid circuit 346 returns to pressurized water tank 316 through high-water float switch and valve 320. A DC electrical generator 348 converts the rotating mechanical torque to electrical power that is converted to AC by an inverter 350. Gears and pulleys in front of the generator may be used to adjust the speed and power input. Fill and drain valves are connected to the various tanks as appropriate. The system control signals may be supported on a computer network or conventional process control loops and can involve wireless connections.

A controller 352 operates the magazine 304 and breach 306, and valves 312 and 314 to coordinate their timing, such that gas pressure from the pressurized-gas tank 310 is alternately routed to each pressurized water tank 316 and 318 until the liquid inside is pushed out into the other. The inverter 350 provides load sensing signals to the controller 352. A throttle control 354 applied to control motors on valves 324 and 326 can be used to control the power output of turbines 340 and 344.

FIG. 4 represents a two-stage electrical generator embodiment of the present invention, and is referred to herein by the general reference numeral 400. Generator 400 uses explosive gases to pressurize water, and then uses two stages of pressurized hydraulics to spin electrical generators with hydraulic motors and turbines. A first Stage-1 uses explosive cartridges to produce hot gases that will pressurize a tank 402. Computer timing and valve control 404 steers the high pressure gas alternately to a first hydraulic pressure tank-A 406 and then to a second hydraulic pressure tank-B 408 according to their respective liquid levels. Water passing from the pressurized one of the tanks to the non-pressurized one is used to spin a hydraulic pump or water turbine 410. Vent gases recovered from hydraulic pressure tank-A 406 and tank-B 408 are captured by a second stage gas pressure tank 412.

The pressure loss in the gas pressures between the first Stage-1 and second Stage-2 is a function of the differential volumes of hydraulic pressure tank-A 406 and tank-B 408 as they cycle between their minimum and maximum water levels.

The second stage gas pressure tank 412 supplies gas to a computer timing and valve control 414 steers the high pressure gas alternately to a third hydraulic pressure tank-C 416 and then to a fourth hydraulic pressure tank-D 418 according to their respective liquid levels. Water passing from the pressurized one of these tanks to the non-pressurized one is used to spin a hydraulic pump or water turbine 420.

Both water turbines 410 and 420 can be geared to drive a single DC electric generator 422. The electrical power produced is temporarily stored in batteries 424, and that can smooth out any voltage variations that would other wise result as the turbines are cycled between the hydraulic pressure tanks. An inverter 426 converts the DC power to AC power, and a transformer 428 is used to produce various commercial voltages, e.g., 110 VAC, 220-VAC, and 440-VAC at 50/60 Hertz.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

The invention claimed is:

1. A generator system, comprising:

a high pressure gas tank providing for the capture and confinement of gases generated by an explosive cartridge;

a magazine and breach connected to the high pressure gas tank, and providing for the operation of said explosive cartridge;

a pair of interconnected liquid tanks connected to receive gases routed from the high pressure gas tank, said liquid tanks containing a liquid and interconnected such that said liquids within flow in a circuit between the liquid tanks;

a high pressure turbine connected to be driven by said liquids flowing between the liquid tanks;

a low pressure gas tank connected to the pair of interconnected liquid tanks, and providing for the capture and confinement of gases vented from the interconnected liquid tanks;

a second pair of interconnected liquid tanks connected to receive gases routed from the low pressure gas tank, said liquid tanks containing a liquid and interconnected such that said liquids within flow in a circuit between the liquid tanks;

a low pressure turbine connected to be driven by said liquids flowing between the second pair of interconnected liquid tanks;

an electric generator connected to be driven by the high pressure and low pressure turbines and able to produce electrical power;

and a controller to operate valves and to coordinate the timing such that gas pressure from the pressurized gas tank is alternately routed to each liquid tank until the liquid inside is pushed out into the other;

wherein energy from said explosive cartridge is converted into electrical power.

2. The system of claim 1, further comprising: a high-water float switch and a low-water float switch disposed in each of the liquid tanks and connected to the controller; wherein the controller is enabled to maintain the liquid levels within each pair of interconnected liquid tanks over an operational range.

3. The system of claim 1, further comprising:

a liquid inlet valve providing a controlled input for each of the pair of interconnected liquid tanks that is connected in a circuit to receive liquids from the other liquid tank in the pair.

4. The system of claim 1, further comprising:

a liquid outlet valve providing a controlled output for each of the pair of interconnected liquid tanks that is connected in a circuit to transmit liquids to the other liquid tank in the pair.

5. The system of claim 1, further comprising:

a liquid inlet valve providing a controlled input for each of the pair of interconnected liquid tanks that is connected in a circuit to receive liquids from the other liquid tank in the pair;

a liquid outlet valve providing a controlled output for each of the pair of interconnected liquid tanks that is connected in a circuit to transmit liquids to the other liquid tank in the pair; and a high-water float switch and a low-water float switch disposed in each of the liquid tanks;

wherein the liquid inlet valve and liquid outlet valve are controlled by the controller according to signals obtained from the high-water float switch and a low-water float switch.

6. A generator system, comprising:

a pressurized-gas tank providing for the capture and confinement of gases generated by an explosive cartridge;

a magazine and breach connected to the pressurized-gas tank, and providing for the operation of said explosive cartridge;

a pair of interconnected first and second liquid tanks connected to receive gases routed from the pressurized-gas tank, said liquid tanks containing a liquid and interconnected such that said liquids within flow in a circuit between the liquid tanks;

a first and a second liquid inlet valve providing a controlled input for each of the pair of interconnected liquid tanks that is connected in a circuit to receive liquids from the other liquid tank in the pair;

a first and a second liquid outlet valve providing a controlled output for each of the pair of interconnected liquid tanks that is connected in a circuit to transmit liquids to the other liquid tank in the pair;

a high-water float switch and a low-water float switch disposed in each of the first and second liquid tanks;

a first turbine connected to be driven by said liquids flowing from said first liquid tank to said second liquid tank;

a second turbine connected to be driven by said liquids flowing from said second liquid tank to said first liquid tank;

an electric generator connected to be driven by at least one of the first and second turbines and able to produce electrical power;

and a controller to operate the magazine and breach, and first and a second liquid inlet valve, and first and a second liquid outlet valves to coordinate their timing, such that gas pressure from the pressurized-gas tank is alternately routed to each liquid tank until the liquid inside is pushed out into the other, and according to signals obtained from the high-water float switch and low-water float switch;

wherein energy from said explosive cartridge is converted into electrical power.

7. A method of converting explosives energy into electrical power, comprising a computer program in software or firmware executed by a conventional microcomputer, with data inputs from sensors and switches digitized for processing, user inputs used to make process control decisions, and outputs to electro-mechanical solenoids to operate gas and hydraulic valves, comprising:

closing pressure tank and water tank vents, and closing water tank inlet valves;

raising a gas pressure in a pressure tank up to an operating level by firing explosive cartridges as needed;

checking a water level inside a water tank-A and if it's at its maximum operating level, beginning a hydraulic cycle, wherein a gas inlet valve-A is opened, a gas vent valve-A is closed, and a water outlet valve-A to an associated turbine-A is opened; wherein, a gas pressure let in can push water out through said outlet valve-A until the water level reaches a minimum, and said outlet valve-A is closed, said gas inlet valve-A is closed, and gas vent valve-A is opened, and water inlet valve-A is opened to receive water from water tank-B; and checking a water level inside a water tank-B and if it's at its maximum operating level, beginning a hydraulic cycle, wherein a gas inlet valve-B is opened, a gas vent valve-B is closed, and a water outlet valve-B to an associated turbine-B is opened; wherein, a gas pressure let in can push water out through said outlet valve-B until the water level reaches a minimum, and said outlet valve-B is closed, said gas inlet valve-B is closed, and gas vent valve-B is opened, and water inlet valve-B is opened to receive water from water tank-A.

8. The method of claim 7, further comprising: if a user is not requesting a stop of operations, the process repeats in a loop.

9. The method of claim 7, further comprising: if a user is requesting a stop of operations, closing gas inlet pressure valves to water tank-A and tank-B, opening gas vents, and closing said water outlet valves to the turbines; wherein, residual gas pressures inside said pressurized tank is let down if another use cycle is not scheduled immediately.

* * * * *